A. PATERSON.

METHOD OF ROLLING SHEETS.

APPLICATION FILED MAR. 29, 1909.

Reissued June 15, 1909.

12,975.

WITNESSES

R. A. Balderson

Jesse B. Keller

INVENTOR

Alexander Paterson, by Bakewell, Byrnes & Parmelee, his Attys.

THE NORRIS PETERS CO., WASHINGTON, D. C.

UNITED STATES PATENT OFFICE.

ALEXANDER PATERSON, OF BUFFALO, NEW YORK.

METHOD OF ROLLING SHEETS.

No. 12,975. Specification of Reissued Letters Patent. Reissued June 15, 1909.

Original No. 819,589, dated May 1, 1906, Serial No. 255,528. Application for reissue filed March 29, 1909. Serial No. 486,632.

*To all whom it may concern:*

Be it known that I, ALEXANDER PATERSON, of Buffalo, in the county of Erie and State of New York, have invented a new and useful Method of Rolling Sheets, of which the following is a full, clear, and exact description, reference being had to the accompanying drawings, forming part of this specification, in which—

Figure 1:
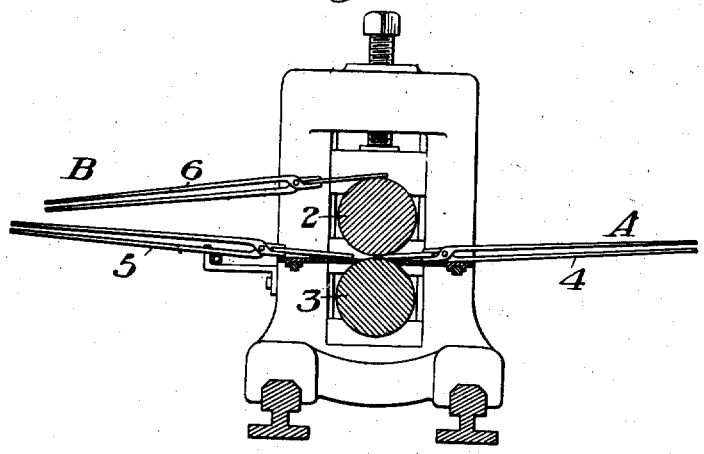
Figure 2:
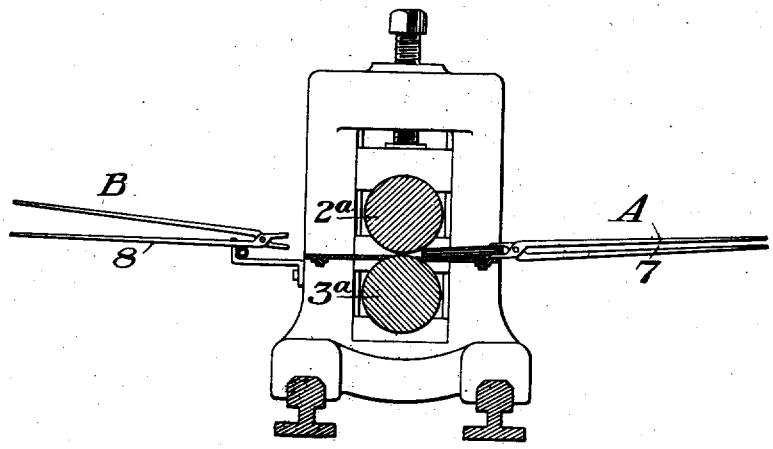

Figure 1 is a diagrammatic sectional side elevation showing the manner of rolling single sheet bars, and Fig. 2 is a similar view showing the rolling of the pack of three obtained from the first operation.

My invention relates to the rolling of sheet bars into thin sheets or plates, and is designed to reduce the cost and increase the output, where an ordinary two-high mill is employed, in single-rolling the sheet-bars.

Heretofore two sheet-bars have been rolled simultaneously on a single two-high mill using two men, one of whom feeds the plates singly and successively through the reducing pass, while the catcher, or man upon the opposite side, receives the plates and hands them over the top of the top roll to the operator who feeds them. After this operation the two are then piled and rerolled. The pack of two is then allowed to cool and then opened and piled in three or more, reheated, and rolled in a two-high stand of rolls. Inasmuch as the piles operated upon in the finishing-mill contain more than two plates, the reheating of the plates has been necessary in order to bring the pack to the proper temperature of finish-rolling.

My invention overcomes the reheating of the rolled sheet-bars before finish-rolling and increases the output, while decreasing the cost.

The invention consists in rolling three sheet-bars at a time in an ordinary two-high mill, three men being preferably employed, one of whom feeds the plates through the reducing-pass, while the other two receive them alternately and pass them back over the top of the upper roll.

The invention also consists in immediately piling the three plates thus rolled simultaneously and rolling the pack without reheating. Inasmuch as the three bars forming the pack are rolled together, the temperature and the thickness of the combined layers will be sufficient for the three to be rolled as a pack after they are reduced to the desirable amount on the first mill, where they are rolled singly.

In the drawings, Figure 1 illustrates, diagrammatically, the rolling of three bars simultaneously on a single mill. In this figure, 2 is the upper roll, and 3 the lower roll, of the ordinary two-high mill, in which the rolls are rotated continuously in the same direction. On the feeding side A, 4 represents the tongs by which the single operator on this side feeds the bars successively into the reducing-pass. On the receiving side B, 5 represents a set of tongs operated by one man, and 6 tongs operated by the other man, the tongs 5 being shown in the position of receiving a plate as it is passed through the rolls, while the tongs 6 are in the position for passing a rolled plate back over the top of the upper roll. I have found that a single feeder may easily handle the three plates in succession.

After the plates are reduced to the desired gage the three are immediately piled together and rolled as a pack, either upon the same mill, or preferably, upon another two-high finishing mill. Thus, in Fig. 2, $2^a$ represents the upper roll, and $3^a$ the lower roll, of the pack-rolling two-high mill, in which the pack is rolled down in the ordinary manner; 7 representing the operator's tongs on one side, and 8 those on the opposite side.

The advantages of my invention result from the single and simultaneous rolling of three bars; also, from the piling and rerolling of the three bars of the pack without reheating, the oxidation is reduced and cleaner sheets are produced. The invention is specially adapted for certain gages of plates, but may be used for different gages. The plates are preferably finish-rolled in the pack of three, though the rolling of the pack may be continued to a thinner gage by reheating and rolling in the ordinary way.

Many variations may be made in the form and arrangement of the mills, feeding devices, etc., without departing from my invention.

I claim:

1. In the method of producing sheets, the steps consisting of rolling three sheet-bars in rapid succession on a single two-high mill, giving each sheet-bar a succession of passes in the same direction in said mill, then immediately forming said three bars into a pack and rolling said pack of three; substantially as described.

2. In the method of producing sheets, the steps consisting of rolling three sheet-bars singly in rapid succession, on a single two-high mill, giving each sheet-bar a succession of passes in the same direction in said mill, and subsequently piling said bars into a pack of three and rerolling the pack without reheating; substantially as described.

In testimony whereof, I have hereunto set my hand, this 25th day of March, 1909.

ALEXANDER PATERSON.

Witnesses:

H. M. CORWIN,

GEO. H. PARMELEE.